United States Patent
Riley et al.

(10) Patent No.: US 9,315,085 B1
(45) Date of Patent: Apr. 19, 2016

(54) ANGLED SPACER MOUNT

(71) Applicant: FABTECH INDUSTRIES, INC., Chino, CA (US)

(72) Inventors: Brent Riley, Chino, CA (US); Steven Erdelyi, Chino, CA (US)

(73) Assignee: Fabtech Industries, Inc., Chino, CA (US)

( * ) Notice: Subject to any disclaimer, the term of this patent is extended or adjusted under 35 U.S.C. 154(b) by 0 days.

(21) Appl. No.: 14/528,141

(22) Filed: Oct. 30, 2014

(51) Int. Cl.
*B60G 11/16* (2006.01)
*B60G 11/52* (2006.01)
*B62D 65/12* (2006.01)
*B60G 15/06* (2006.01)

(52) U.S. Cl.
CPC ............ *B60G 11/16* (2013.01); *B60G 11/52* (2013.01); *B60G 15/067* (2013.01); *B62D 65/12* (2013.01); *B60G 2204/124* (2013.01); *B60G 2204/128* (2013.01); *B60G 2206/911* (2013.01); *B60G 2500/20* (2013.01)

(58) Field of Classification Search
CPC .. B60G 11/16; B60G 11/52; B60G 2204/124; B60G 2500/20; B60G 15/067; B60G 2204/128; B60G 2206/911; B62D 65/12
USPC .................. 280/124.165, 124.168, 124.179
See application file for complete search history.

(56) References Cited

U.S. PATENT DOCUMENTS

| | | | | |
|---|---|---|---|---|
| 3,195,918 | A * | 7/1965 | Poole | B60G 11/52 267/220 |
| 6,951,343 | B2 | 10/2005 | Hildebrand | |
| 7,631,882 | B2 * | 12/2009 | Hirao | B60G 11/16 267/166 |
| 2010/0243848 | A1 * | 9/2010 | Onda | B60G 11/16 248/346.5 |
| 2015/0123359 | A1 * | 5/2015 | Yoder | B60G 15/067 280/6.157 |

FOREIGN PATENT DOCUMENTS

JP 11310021 A * 11/1999

OTHER PUBLICATIONS

JKS Manufacturing, Inc. & Aftermarketing, LLC, "Wrangler JK, 2007-2014, Adjustable Rear Spring Mount", Aug. 20, 2014, 3 pages.
MAXTRAC Suspension, "Product: 832125 06-12 Dodge Ram 1500 4WD 2.5" Leveling Kit", 3 pages.
Total Cost Involved, "1935-1940 Ford Car & 1935-1941 Ford Truck Coil-Spring Front End", 2012, 10 pages.
FABTECH, "Installation Instructions 1 3/4" 1993-1998 Jeep ZJ 4WD FTS24013BK", 3 pages.

* cited by examiner

*Primary Examiner* — Faye M Fleming
(74) *Attorney, Agent, or Firm* — Stetina Brunda Garred & Brucker

(57) ABSTRACT

An angled spacer mount for a suspension of a vehicle is disclosed. The angled spacer mount has upper and lower flanges that are set apart from each other at a specific skewed angle. By doing so, the angled spacer mount may be mounted to a spring perch of the suspension of the vehicle to change a curvature characteristic of a coil spring used in the vehicle suspension. The angled spacer mount may be operative to straighten a coil spring to better isolate road conditions from a passenger compartment.

15 Claims, 2 Drawing Sheets

ANGLED SPACER MOUNT

CROSS-REFERENCE TO RELATED APPLICATIONS

Not Applicable

STATEMENT RE: FEDERALLY SPONSORED RESEARCH/DEVELOPMENT

Not Applicable

BACKGROUND

The various embodiments and aspects disclosed herein relate to a device for changing a curvature characteristic of a coil spring of a suspension of a vehicle.

The suspension of the vehicle attempts to accomplish a plurality of purposes. By way of example and not limitation, the vehicle suspension may attempt to isolate or absorb road shock from the passenger compartment. The suspension system of the vehicle may also attempt to increase the degree to which a car maintains contact with the road surface while turning or traveling in a straight forward direction. Unfortunately, prior art vehicle suspension systems sub-optimally achieve one or more of these functions.

Accordingly, there is a need in the art for an improved suspension system for a vehicle.

BRIEF SUMMARY

The various embodiments and aspects described herein address the needs discussed above, discussed below and those that are known in the art.

An angled spacer mount is provided which may be used to change a curvature characteristic of a coil spring of a suspension system of a vehicle. The angled spacer mount changes the curvature characteristic of the coil spring from its factory setting, namely, from a curved configuration to straight configuration. By straightening the coil spring used in the suspension system of the vehicle, the straight coil spring isolates uneven road conditions from the passenger compartment better than prior art curved coil springs.

More particularly, a vehicle suspension system of a vehicle is disclosed. The system may comprise a frame of the vehicle, a coil spring rubber isolator, an axle, a coil spring alignment spacer and a coil spring. The coil spring rubber isolator may be mounted to an underside of an upper portion of the frame of the vehicle. The axle may be pivotally attached to a lower portion of the frame of the vehicle. The axle may have a spring perch. The coil spring alignment spacer may be mounted to the spring perch. The coil spring alignment spacer may have a lower flange, an upper flange, an extension (e.g., cylinder that provides for a fixed gap between the upper and lower flanges) and a spring locator. The lower flange may be sized and configured to mount to the spring perch. The upper flange may be sized and configured to mate with the coil spring. The extension may have an upper end and a lower end at a skewed angle with respect to the upper end. The upper and lower ends of the extension may be flat. The upper flange may be attached to and in line with the upper end of the extension. The lower flange may be attached to and in line with the lower end of the extension wherein the upper and lower flanges are oriented at the skewed angle with respect to each other. The spring locator may extend perpendicularly with respect to the upper flange. The coil spring may define an upper end and a lower end. The upper end of the coil spring may be seated on the coil spring rubber isolator. The lower end may be disposed about the spring locator and seated on the upper flange of the spacer.

The skewed angle between the upper and lower flanges provides for a straight coil spring when the vehicle is at rest.

A length of the coil spring may be less than a length of a factory coil spring for the vehicle. The coil spring may be shorter than a factory coil spring to maintain a height of a passenger compartment of the vehicle. It is also contemplated that the length of the coil spring may be longer than the length of the factory coil spring in order to lift the passenger compartment of the vehicle. It is also contemplated that the factory coil spring may be reused in lieu of using a replacement coil spring.

The lower flange may optionally have an indexing foot for allowing mounting of the lower flange of the coil spring alignment spacer to the spring perch in only one angular orientation.

In another aspect, a kit for a suspension of a vehicle is disclosed. The kit may comprise a coil spring and a coil spring alignment spacer. The coil spring may define an upper end and a lower end. The upper end may be seated onto a coil spring rubber isolator of the suspension of the vehicle. The coil spring alignment spacer is used to mount the coil spring to a suspension of the vehicle. The coil spring alignment spacer may have a lower flange, an upper flange, an extension and a spring locator. The lower flange may be sized and configured to mount to a spring perch of an axle of the suspension of the vehicle. The upper flange may be sized and configured to receive the lower end of the coil spring. The extension may have an upper end and a lower end at a skewed angle. The upper flange may be attached to and in line with the upper end of the extension. The lower flange may be attached to and in line with the lower end of the extension wherein the upper and lower flanges are oriented at the skewed angle with respect to each other. The spring locator may extend perpendicularly with respect to the upper flange.

The skewed angle of the upper and lower flanges allows for a straight coil spring to replace a factory curved coil spring.

A length of the coil spring may be less than a length of a factory coil spring for the vehicle. The coil spring may be shorter than a factory coil spring to maintain a height of a passenger compartment of the vehicle.

The lower flange may have an indexing foot for allowing mounting of the lower flange of the coil spring alignment spacer to the spring perch in only one angular orientation.

Preferably, at least a lowest most coil of the coil spring may have an outer diameter less than upper coils. However, it is also contemplated that the outer diameter of the coils may be consistent throughout a length of the coil spring.

In another aspect, a method of installing a kit onto a suspension of a vehicle is disclosed. The method may comprise the steps of removing a factory coil spring from the suspension of the vehicle; aligning an upper flange of an alignment spacer or mount to a coil spring upper rubber isolator of the suspension of the vehicle so that a coil spring is straight when the vehicle is at rest; mounting a lower flange of the coil spring alignment spacer to a spring perch of the suspension of the vehicle; and disposing a lower end of a coil spring of the kit between the spacer and the coil spring upper rubber isolator.

The mounting step may include the step of aligning an indexing foot of the lower flange within an outer wall of the spring perch.

The method may further comprise the step of providing the coil spring alignment spacer with the upper and lower flanges at a skewed angle so that coil spring is straight when the vehicle is at rest.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
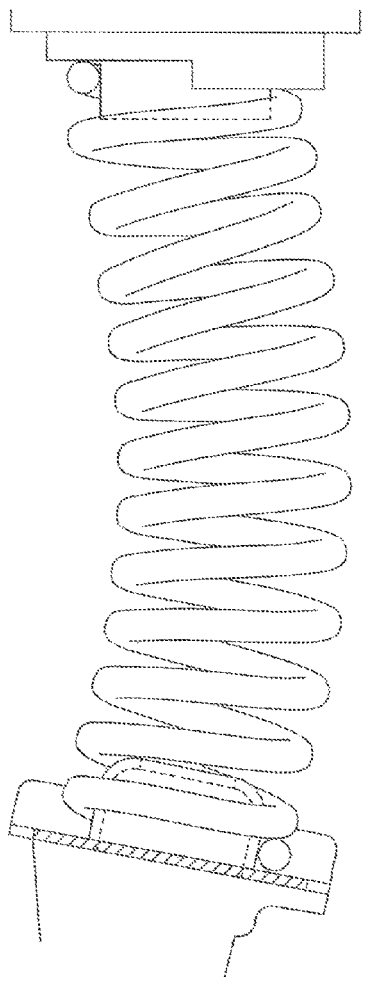
FIG. 1 is a front view of a prior art coil spring illustrating a curved configuration of the prior art coil spring when mounted in a suspension system of a vehicle.
Figure 2:
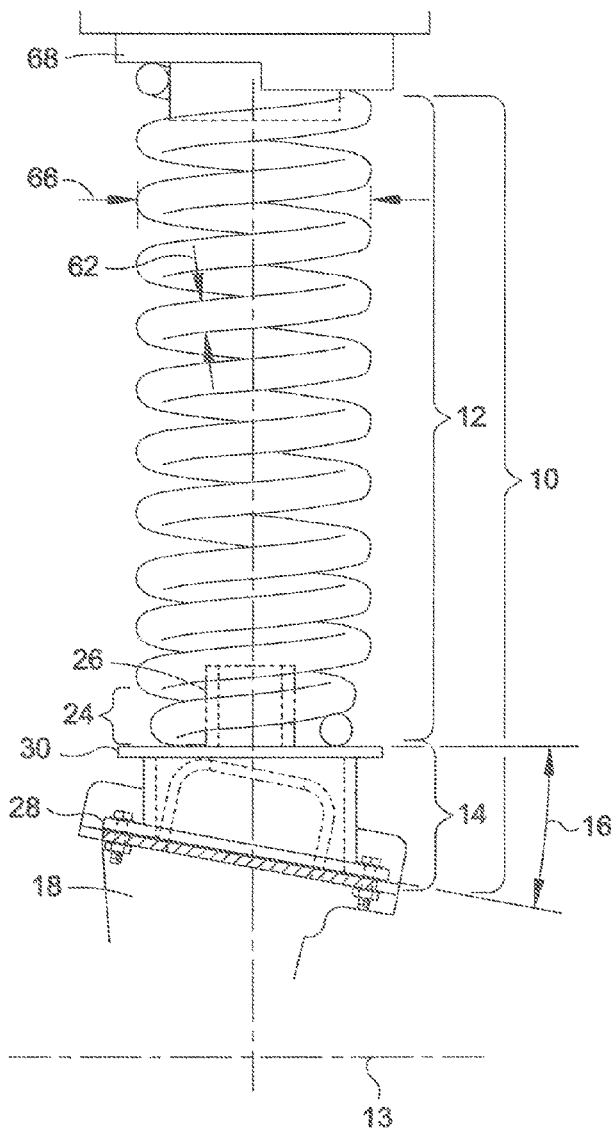
FIG. 2 is a front view of a coil spring with a straight configuration as mounted in the suspension system of the vehicle with an angled spacer mount.
Figure 3:
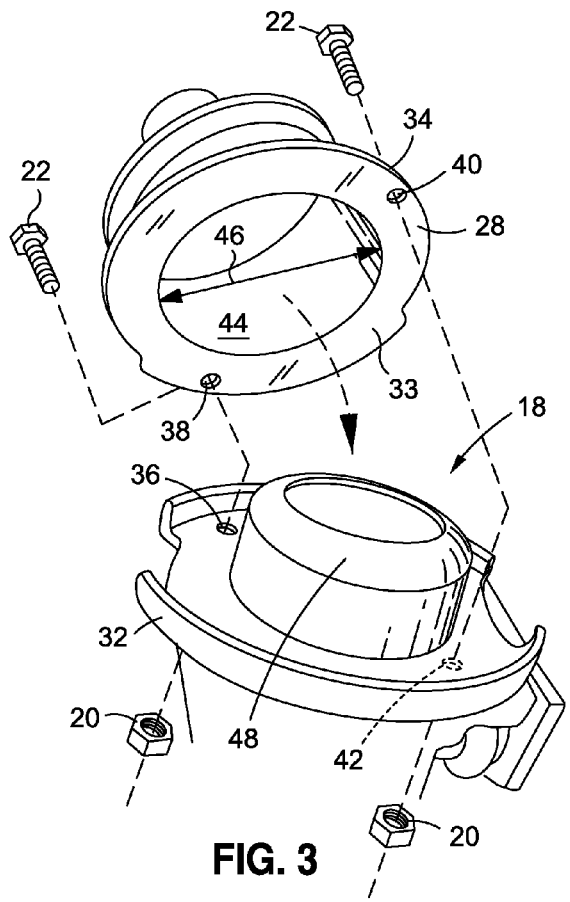
FIG. 3 is an exploded perspective view of the angled spacer mount and a spring perch of the suspension system of the vehicle.
Figure 4:
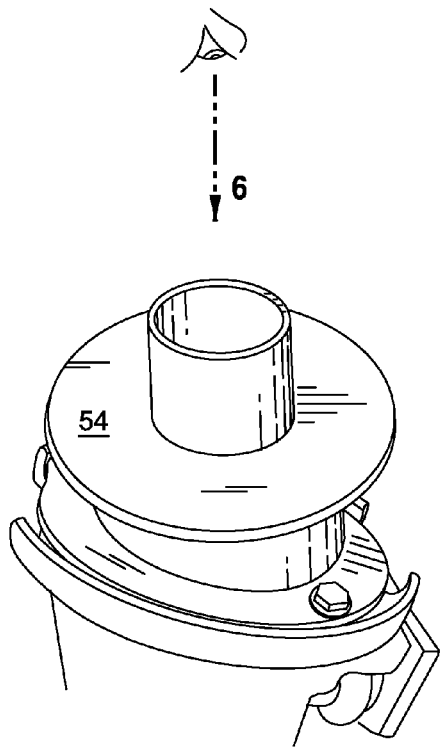
FIG. 4 is an assembled view of the angled spacer mount and the spring perch of the suspension system of the vehicle.
Figure 5:
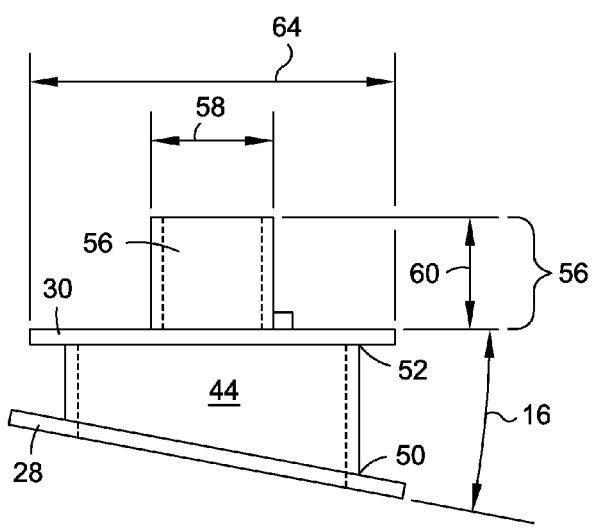
FIG. 5 is a front view of the angled spacer mount.
Figure 6:
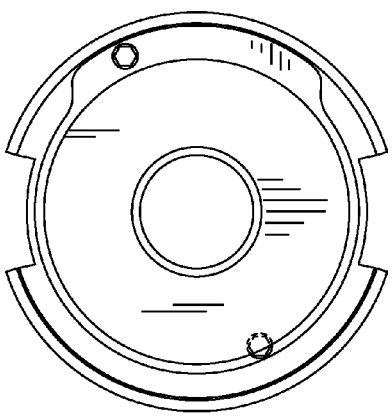
FIG. 6 is a top view of the angled spacer mount and spring perch as shown in FIG. 4.

Referring now to the drawings, a suspension kit 10 for changing a ride characteristic of a factory suspension of a vehicle is disclosed. The suspension kit 10 straightens a coil spring 12 from a curved configuration set by the factory. For example, the prior art coil spring shown in FIG. 1 is curved when the vehicle is at rest. By straightening the coil spring 12 as shown in FIG. 2, the ride is smoother compared to the curved prior art coil spring shown in FIG. 1. In particular, the installed suspension kit 10 isolates the uneven road conditions from the passenger compartment better compared to the prior art coil springs 12. The coil spring 12 is straightened with an angled spacer mount 14 which corrects for an angle 16 of a spring perch 18 of the suspension (or axle 13) of the vehicle.

The vehicle described and shown herein relates to a 2014 Dodge Ram truck. However, the various aspects and features described herein may be applied to other types of trucks, automobiles, passenger vehicles, light duty trucks, or with any vehicle which incorporates a coil spring in its suspension system.

The suspension kit 10 includes the coil spring 12, the angled spacer mount 14 and one or more nuts 20 and bolts 22 for attaching the angled spacer mount 14 to the spring perch 18. The coil spring 12 may be the original factory coil spring. By using the original factory coil spring, the passenger compartment of the vehicle is raised by a height of the angled spacer mount 14. It is also contemplated that the length of the coil spring 12 may be lengthened or shortened in order to raise or lower the elevational height of the passenger compartment of the vehicle. Preferably, a new replacement coil spring 12 is provided in the suspension kit 10 and is shorter than the original factory coil spring so that the elevation of the passenger compartment of the vehicle is not altered from its original height. Rather, the elevation of the passenger compartment of the vehicle remains the same. The coil spring 12 is shortened to accommodate the height of the angled spacer mount 14.

The coil spring 12 may be a coil compression spring. All of the coils may have a constant diameter throughout the length of the coil compression spring 12 except for the lowest most coil 24. The lowest most coil 24 may have a smaller outer diameter so that the lowest most coil may wrap around a protruding spring locator 26 of the angled spacer mount 14 in order to position the lower end of the coil spring 12 on the spring perch 18 of the suspension of the vehicle.

The angled spacer mount 14 may include a lower flange 28 and an upper flange 30. The lower flange 28 may have a generally circular outer periphery and be sized and configured to be received within an outer wall 32 of the spring perch 18. In particular, the outer peripheral boundary 34 of the lower flange 28 of the angled spacer mount 14 may be smaller than the inner peripheral boundary defined by the outer wall 32 of the spring perch 18. The outer peripheral boundary 34 of the lower flange 28 is also defined by an indexing foot 33 which helps to angularly orient the angled spacer mount 14 within the outer wall 32 of the spring perch 18 since the outer wall 32 receives the lower flange 28 only in one orientation, as discussed below. The spring perch 18 has a factory drilled hole 36. The lower flange 28 has two different holes 38, 40 on opposite sides of each other. The hole 38 is aligned to the factory drilled hole 36 and nuts and bolts 20, 22 are used to secure the lower flange 28 to the spring perch 18. The other side of the lower flange 28 is also secured to the spring perch 18. To this end, the hole 40 in the lower flange 28 is used as a guide to drill a hole through the factory spring perch 18 to form hole 42. Nut and bolt 20, 22 are used to secure the other side of the lower flange 28 to the spring perch 18 by threading the bolt 22 through the holes 40, 42 and tightening the bolt 22 down with the nut 20.

The lower flange 28 extends outwardly from a wall of an extension 44. As described herein the wall may have a cylindrical configuration but other configurations are also contemplated. As shown in the drawings, the wall of the extension 44 may have a cylindrical configuration which defines an inner diameter 46 that fits around a protrusion 48 of the spring perch 18. The protrusion 48 was originally used to capture the lower end of the factory coil spring 12. When the angled spacer mount 14 is attached to the spring perch 18, the protrusion 48 of the spring perch 18 fits within a cavity defined by the wall of the extension 44.

The wall of the extension 44 may have a lower end 50 and an upper end 52. The lower end 50 may be chop cut at an angle 16 with respect to the upper end 52. The angle 16 may be set so that the coil spring 12 is straight as shown in FIG. 2 instead of curved as shown in FIG. 1 when the suspension kit 10 is installed in the suspension of the vehicle. Alternatively, it is also contemplated that the angle 16 may be increased or decreased in order to curve the coil spring 12 less than the angle of curvature or more than an angle of curvature compared to the factory settings.

The lower end 50 of the wall of the extension 44 may be attached (e.g., welded) to the inner peripheral portion of the lower flange 28. The upper end 52 of the wall of the extension 44 may be attached (e.g., welded) to a bottom side of a circular plate that forms the upper flange. The circular plate also defines a receiving surface 54 that accepts the lower end of the coil spring 12. The spring locator may fabricated as a circular tube 56 and may protrude perpendicularly out of the circular plate. The circular tube 56 may have an outer diameter 58 which is smaller than an inner diameter of the lowest most coil 24 of the coil spring 12. A height 60 of the circular tube 56 may be at least one or two times an outer diameter 62 of the wire rod forming the coil spring 12. An outer diameter 64 of the circular plate that forms the upper flange 30 may be smaller than an outer diameter 66 of the coil spring 12.

To install the suspension kit 10, the original factory coil spring and a lower rubber isolator for the factory coil spring may be removed from the suspension of the vehicle. The angled spacer mount 14 is then secured to the spring perch 18 by bolting the lower flange 28 of the angled spacer mount 14 to the spring perch 18. The hole 38 formed in the lower flange 20 is aligned to the factory drilled hole 36 in the spring perch 18. This also properly aligns the angular orientation of the upper flange 30 to straighten the coil spring 12 when installed. If the hole 40 in the lower flange 28 is aligned to the factory drilled hole 36, then the upper flange 30 would be significantly tilted in the same direction as the spring perch so that the installer would immediately know that the angled spacer mount 14 needs to be rotated 180°. Moreover, the indexing foot 33 forces the lower flange 28 to be received within the outer wall 32 of the spring perch 28 with the hole 38 of the lower flange 28 of the angled spacer mount 14 aligned only to the hole 36 of the spring perch 18. The indexing foot 33 prohibits the lower flange 28 of the angled spacer mount 14 from being mounted to the spring perch 18 in the opposite direction or with the hole 40 of the lower flange 28 of the angled spacer mount 14 from aligned to the hole 36 of the spring perch 18. The lower flange 28 physically will only fit within the outer wall 32 of the spring perch 18 only if the holes 36, 38 are aligned. Once the hole 38 of the lower flange 28 of the angled spacer mount 14 is aligned to the factory drilled hole 36 of the spring perch 18, the nut and bolt 20, 22 are used to secure the lower flange to the spring perch 18. Initially, the nut and bolt 20, 22 may be lightly tightened in order to merely hold the angled spacer mount 14 to the spring perch 18. The hole 40 of the lower flange 28 may then be used as a guide to form the hole 42 in the spring perch. With the angled spacer mount 14 secured to the spring perch 18, a drill bit is inserted into the hole 40 and used to form the hole 42 in the spring perch 18. Nut and bolt 20, 22 are threaded through the holes 40, 42 and tightened in order to secure the lower flange 28 to the spring perch 18. The nuts and bolts 20, 22 may be tightened to about 29 foot pounds of torque.

Thereafter, the coil spring 12 is disposed between the angled spacer mount 14 and an upper rubber isolator 68 that was originally used for the original factory coil spring. In particular, the upper end of the coil spring 12 is mounted to the upper rubber isolator 38. The lower end of the coil spring 12 is disposed about the circular tube 56 and pushes against the receiving surface 54 of the upper flange 30. The various parts of the suspension of the vehicle are then reassembled in order to place compressive tension on the coil spring 12.

When the vehicle is at rest and the coil spring 12 is under compression, the coil spring 12 is preferably straight as shown in FIG. 2 and provides for a smoother ride. In particular, the straight coil spring 12 isolates the uneven road from the passenger compartment of the vehicle better than the prior art curved coil spring.

The angled spacer mount 14 may be manufactured from a metallic material, aluminum, steel, an aluminum alloy, steel alloy, polymer composite, elastomeric material or combinations thereof. Moreover, as discussed above, the lower and upper ends of the wall of the extension 44 may be attached to the upper and lower flanges 30, 28 by welding. However, other ways of joining the parts to each other are also contemplated such as nuts and bolts, adhesives, welding, brazing and riveting. Additionally, other way of manufacturing the angled spacer mount 14 (i.e., wall, upper flange and the lower flange) are also contemplated such as forging, casting, injection molding and 3D printing. When utilizing these other methods of manufacturing, the wall of the extension and the upper and lower flanges may be formed as a unitary part.

The above description is given by way of example, and not limitation. Given the above disclosure, one skilled in the art could devise variations that are within the scope and spirit of the invention disclosed herein, including various ways of assembling and disassembling the suspension of the vehicle. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A vehicle suspension system of a vehicle, the system comprising:
    a frame of the vehicle;
    a coil spring rubber isolator mounted to an underside of an upper portion of the frame of the vehicle;
    an axle pivotally attached to a lower portion of the frame of the vehicle, the axle having a spring perch;
    a coil spring alignment spacer mounted to the spring perch, the spacer having:
        a lower flange sized and configured to mount to the spring perch;
        an upper flange sized and configured to mate with the coil spring;
        an extension having an upper end and a lower end at a skewed angle with respect to the upper end, the upper flange being attached to and in line with the upper end of the extension, the lower flange being attached to and in line with the lower end of the extension wherein the upper and lower flanges are oriented at the skewed angle with respect to each other;
        a spring locator extending perpendicularly with respect to the upper flange;
    a coil spring defining an upper end and a lower end, the upper end of the coil spring seated on the coil spring rubber isolator, the lower end disposed about the spring locator and seated on the upper flange of the spacer.

2. The system of claim 1 wherein the skewed angle provides for a straight coil spring when the vehicle is at rest.

3. The system of claim 1 wherein a length of the coil spring is less than a length of a factory coil spring for the vehicle.

4. The system of claim 1 wherein the lower flange has an indexing foot for allowing mounting of the lower flange of the coil spring alignment spacer to the spring perch in only one angular orientation.

5. The system of claim 1 wherein the coil spring is shorter than a factory coil spring to maintain a height of a passenger compartment of the vehicle.

6. A kit for a suspension of a vehicle, the kit comprising:
    a coil spring defining an upper end and a lower end, the upper end seatable onto coil spring rubber isolator of the suspension of the vehicle;
    a coil spring alignment spacer for mounting the coil spring to a suspension of the vehicle, the spacer having:
        a lower flange sized and configured to mount to a spring perch of an axle of the suspension of the vehicle;
        an upper flange sized and configured to receive the lower end of the coil spring;
        an extension having an upper end and a lower end at a skewed angle, the upper flange being attached to and in line with the upper end of the extension, the lower flange being attached to and in line with the lower end of the extension wherein the upper and lower flanges are oriented at the skewed angle with respect to each other;
        a spring locator extending perpendicularly with respect to the upper flange.

7. The kit of claim 6 wherein the skewed angle of the upper and lower flanges allows for a straight coil spring to replace a factory curved coil spring.

8. The kit of claim 6 wherein a length of the coil spring is less than a length of a factory coil spring for the vehicle.

9. The kit of claim 6 wherein the lower flange has an indexing foot for allowing mounting of the lower flange of the coil spring alignment spacer to the spring perch in only one angular orientation.

10. The kit of claim 6 wherein the coil spring is shorter than a factory coil spring to maintain a height of a passenger compartment of the vehicle.

11. The kit of claim 6 wherein at least a lowest most coil of the coil spring has an outer diameter less than upper coils.

12. The kit of claim 6 wherein the spring locator has a height equal to about 1 to 2 times a diameter of a wirerod of the coil spring.

13. A method of installing a kit onto a suspension of a vehicle, the method comprising the steps of:
- removing a factory coil spring and a lower rubber isolator from the suspension of the vehicle;
- mounting a lower flange of a coil spring alignment spacer to a spring perch of the suspension of the vehicle;
- disposing a lower end of the coil spring of the kit between the coil spring alignment spacer and a coil spring upper rubber isolator by aligning, an upper end of the coil spring to the coil spring upper rubber isolator and a lower end of the coil spring to the coil spring alignment spacer so that the coil spring is straight when the vehicle is at rest.

14. The method of claim 13 wherein the mounting step includes the step of aligning an indexing foot of the lower flange within an outer wall of the spring perch.

15. The method of claim 13 further comprising the step of providing the coil spring alignment spacer with the upper and lower flanges at a skewed angle so that coil spring is straight when the vehicle is at rest.

* * * * *